US012461720B2

(12) United States Patent
Martinez Canedo et al.

(10) Patent No.: US 12,461,720 B2
(45) Date of Patent: Nov. 4, 2025

(54) SYSTEM AND METHOD FOR ADAPTING A RECONFIGURABLE RUNTIME SYSTEM USED IN AUTOMATION SYSTEMS (71) Applicant: Siemens Aktiengesellschaft, Munich (DE)

(72) Inventors: Arquimedes Martinez Canedo, Plainsboro, NJ (US); Lingyun Wang, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 73 days.

(21) Appl. No.: 18/550,765

(22) PCT Filed: May 12, 2021

(86) PCT No.: PCT/US2021/031888
§ 371 (c)(1),
(2) Date: Sep. 15, 2023

(87) PCT Pub. No.: WO2022/240398
PCT Pub. Date: Nov. 17, 2022

(65) Prior Publication Data
US 2024/0160420 A1 May 16, 2024

(51) Int. Cl.
*G06F 8/36* (2018.01)
*G06F 8/33* (2018.01)
(Continued)

(52) U.S. Cl.
CPC .......... *G06F 8/36* (2013.01); *G06F 8/33* (2013.01); *G06F 8/44* (2013.01); *G06F 8/60* (2013.01)

(58) Field of Classification Search
None
See application file for complete search history.

(56) References Cited

U.S. PATENT DOCUMENTS 9,009,058 B2 * 4/2015 Erickson ................ G06F 8/34
705/1.1
2009/0125892 A1 * 5/2009 Crewdson ............... G06F 8/70
717/136

(Continued)

FOREIGN PATENT DOCUMENTS

WO 20070056807 A1 5/2007

OTHER PUBLICATIONS

Izraelevitz et al., "Reusability is FIRRTL Ground: Hardware Construction Languages, Compiler Frameworks, and Transformations," IEEE, 2017. (Year: 2017).*

(Continued)

*Primary Examiner* — Ryan D. Coyer (57) ABSTRACT

A system and method for constructing a reconfigurable runtime system used in an automation system using reusable runtime functions (RRFs) is disclosed. A specialization module executes a specialization operation to configure or customize at least one RRF to satisfy functional requirements of the automation system. A stitching module executes a stitching operation that connects output of at least one RRF to input of one or more other RRFs. A stacking module executes a stacking operation that stacks RRFs as layers to create new abstractions, functionality and services. The specialization operation, the stitching operation, and the stacking operation are performed according to a runtime specification language.

15 Claims, 4 Drawing Sheets (51) Int. Cl.
    *G06F 8/41*          (2018.01)
    *G06F 8/60*          (2018.01)

(56) References Cited

U.S. PATENT DOCUMENTS

2016/0054982 A1*   2/2016   Itani .......................... G06F 8/20
                                                         717/105
2018/0314549 A1*  11/2018   Chokkalingam ... H04L 41/0893

OTHER PUBLICATIONS

Lilis et al., "A Survey of Metaprogramming Languages," ACM, 2019. (Year: 2019).*
Rompf et al., "Lightweight Modular Staging: A Pragmatic Approach to Runtime Code Generation and Compiled DSLs," ACM, 2012. (Year: 2012).*
Santana et al., "Reducing Global Schedulers' Complexity Through Runtime System Decoupling." WSCAD 2018—XIX Simpósio de Sistemas Computacionais de Alto Desempenho, Oct. 2018, São Paulo, Brazil. pp. 1-12. (Year: 2018).*

* cited by examiner

SYSTEM AND METHOD FOR ADAPTING A RECONFIGURABLE RUNTIME SYSTEM USED IN AUTOMATION SYSTEMS

TECHNICAL FIELD

This application relates to a runtime system used in automation systems. More particularly, this application relates to adapting a reconfigurable automation runtime system with reusable runtime functions.

BACKGROUND

A runtime system refers to the collection of software, firmware, and/or hardware resources that enable a software program to be executed on the operating system of a computer. The runtime system is a composite mechanism designed to provide program execution services, regardless of the programming language being used. Runtime is defined as a lifetime phase of software or firmware program development, beginning when the program is loaded to memory along with its framework, components and libraries. A compiler loads the program to memory and the operating system assigns required memory, processor resources, input/output resources to the program from start to finish of the runtime.

Today, software/firmware for a runtime system used in automation systems (e.g., an industrial system of robots deployed in a production or manufacturing line) are monolithic and built for a specific purpose. All functions configured by a software developer for a runtime system are hardcoded and any modifications are nearly impossible, forcing a rewrite the entire runtime program. For example, if it is desired to add a new driver to a deployed runtime system, such as a new driver to support Bluetooth or a new network driver, the drivers are in kernel space and monolithic, preventing a simple reconfiguration of the runtime system. As another example, if the runtime system is configured to be real-time operable, it cannot later be easily modified to be non-real time operable. Or if the runtime system is originally designed to have preemptive scheduling, and later it is desired to try other kinds of scheduling, this change to the program is not practically possible. The implementation of new features requires very large engineering efforts. Adapting automation runtime systems to new requirements in a very short time is a challenge in current implementations.

Current approaches for runtime system development include Brownfield development and Greenfield development. In Brownfield development, an existing runtime system is modified or adapted to the new requirements. If the new requirements can be easily addressed by the existing functionality, this requires simple configuration. However, most times the new requirements require significant re-engineering of the runtime system and this causes long development cycles that take from months to years. Furthermore, these modifications to the original runtime system often introduce errors that are costly to fix. One example of this is the use of programmable logic controllers (PLCs) to control water control systems in Navy ships. The PLC runtime system must be hardened to the specific requirements of maritime environments. This results in separate system development branches and introduces software engineering overheads.

In Greenfield development, runtime systems are developed from scratch as a brand new runtime system. This allows the runtime system developer to create a custom solution to exactly address the new requirements. However, starting a brand new runtime program from scratch takes a major effort that can span over multiple years. Furthermore, once the runtime system is released and new requirements arise, the "brand new" runtime system must be adapted and re-engineered. Developing a brand new runtime system is extremely expensive, and this yields significant organizational overheads as separate company divisions and groups must be maintained for the isolated developments. Neither the Brownfield nor the Greenfield development approach allows for easy modifications whenever new requirements arise.

SUMMARY

A system and method are disclosed for adapting an automation runtime system to new requirements in a very short time through a runtime specific language that composes reusable runtime functions into the desired functionality. This adaptation moves away from the common notion that programs of runtime systems must be hardcoded (i.e., data or parameters being directly embedded into the source code instead of obtaining the data or parameters from eternal sources or generating at runtime). Aspects of functionality, such as timing, concurrency, availability, safety, and other properties of the runtime system are composed and defined as a configuration according to the runtime specific language instead of design decisions being encoded in a fixed monolithic format for deployment. In the domain of automation systems, examples of functional configurations include realtime/non-realtime, and field bus protocol support (e.g., OPC-A), which would normally require building a new firmware to be supplied to customer whenever an update is needed (e.g., upon a new protocol being introduced). With the disclosed embodiments, the runtime system can be adapted—new features can be added or features can be updated to the runtime system using configuration modules, such as for stitching, stacking, and specialization operations on the reusable functions. Such runtime system reconfigurations can occur without having to shut down the automation system to deploy an entirely new runtime software or firmware as with current monolithic designs.

In an aspect, a system is provided for constructing a reconfigurable runtime system used in an automation system using reusable runtime functions (RRFs). The system has a memory with modules stored thereon and a processor for performing executable instructions in the modules stored on the memory. The modules include a specialization module configured to execute a specialization operation to configure or customize at least one RRF to satisfy functional requirements of the automation system. A stitching module is configured to execute a stitching operation that connects output of at least one RRF to input of one or more other RRFs. A stacking module is configured to execute a stacking operation that stacks RRFs as layers to create new abstractions, functionality and services. The specialization operation, the stitching operation, and the stacking operation are performed using one or more keywords according to a runtime specification language.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Methods and systems are disclosed for solving the above technical problem by constructing and adapting use-specific runtime systems using a configuration programming language to instantiate functionality through reusable runtime functions (RRF). The configuration programming language builds functionality, specifying the runtime behavior by turning RRFs on or off as desired. These RRFs are interoperable with one another such that the compatibility among different runtimes is assured. For example, even when an RRF such as "OPC UA Communication" is used in runtime systems for different automation use cases, such as building automation and factory automation, elements of the two runtime systems can be shared seamlessly because they use same reusable functions, despite how it is used or how it is configured. This reusability and interchangeability of runtime functions is the basis for the embodiments of this disclosure, which can greatly accelerate development and adaptation of runtime systems.

TABLE 1 below provides a description of these various examples of RRFs that may be instantiated according to the embodiments of this disclosure.

TABLE 1

| RRF | Description of Parameters |
| --- | --- |
| Code organization | The user programs can be organized in different ways. For example, code organization options may include: operational blocks (OBs), function blocks (FBs), data blocks (DBs), or flat structures. |
| Connectivity | The communication protocols for the controller to interact with other control systems. For example, the protocols can be: (a) PROFINET, (b) OPC-UA, (c) Modbus, (e) EtherCat, etc. |
| Analog-Digital Encoding/ Decoding | Control systems interact with the physical world. Real-world signals come in the analog domain and must be encoded and decoded to/from digital. For example, the digital-analog conversion can be: (a) pulse-width modulation (PWM), (b) delta-sigma modulation, (c) binary-weighted, etc. |
| Hosting Type | A runtime system is executed in hardware. For example, the hosting can be: (a) in bare-metal, (b) within an operating system, (c) in a virtualized environment, (d) in a container. These categories can run on: (i) a cloud computer, (ii) a CPU, (iii) a GPU, etc. |
| Interrupt and Failure handling | Interrupts and failure modes determine how the runtime system reacts to unexpected events. For example, the options can be: (a) blocking, or (b) non-blocking. |
| Logging | Parameters, sources, and capabilities can be defined for logging of generated data. For example, logging can be categorized as: (a) data from the runtime system itself, (b) data from the environment. Additionally, the logging can be configured to different frequencies, data format, compression, encryption, etc. |

TABLE 1-continued

| RRF | Description of Parameters |
| --- | --- |
| Memory organization | Memory can be organized in various ways to facilitate the programming of the runtime. For example, memory structures can include (a) flat memory, or (b) hierarchical. Other options that can configure the memory are the size of data structures, read-only/read-write, etc. |
| Communication Openness | A runtime system is enabled to communicate with other runtime systems or applications. For example, the openness parameters define the means of the communication, which can be via one or more of the following: (a) a web server/REST, (b) an API via SDK, (c) communication protocols such as OPC-UA or TCP/IP, (d) scripting interfaces, (e) Human-Machine Interfaces, etc. |
| Process Image | The interaction of the runtime system with the physical world around it is done through a process image that, on every cycle, is read, processed, written. For example, the process image can have: (a) size (in Mb), (b) Number of Input/Outputs, (c) type of I/Os such as analog or digital. |
| Programming Language | User programs or applications can be written in various languages. For example, options may include (a) IEC61131-3, (b) C++, (c) Python, (d) Java, etc. |
| Scaling | In case more computation is required, the runtime system can be scaled to accommodate higher loads. For example, the scaling can be defined as: (a) centralized, or (b) decentralized. |
| Scheduling | A real-time system executes a set of concurrent real-time tasks in a such a way that all time-critical tasks meet their specified deadlines. Every task needs computational and data resources to complete the job. The scheduler allocates the resources to satisfy the timing constraints. Scheduling RRF can be: (a) soft scheduling, or (b) hard scheduling (e.g., static hard scheduling, dynamic hard scheduling). Both static and dynamic hard scheduling can be done (i) preemptively, and (ii) non-preemptively. |
| Security | Security measures protect the runtime system against cyber-attacks and isolated failures. For example, security function properties can include: (a) firewalls, (b) packet analysis, (c) anomaly detection, (d) memory protection, (e) stack protection, (f) software diversification, etc. |
| Timing | Synchronous behavior of the runtime system is defined by the timing RRF. For example, timing can be: (a) hard real-time, (b) soft real-time, (c) non real-time. |

Figure 1:
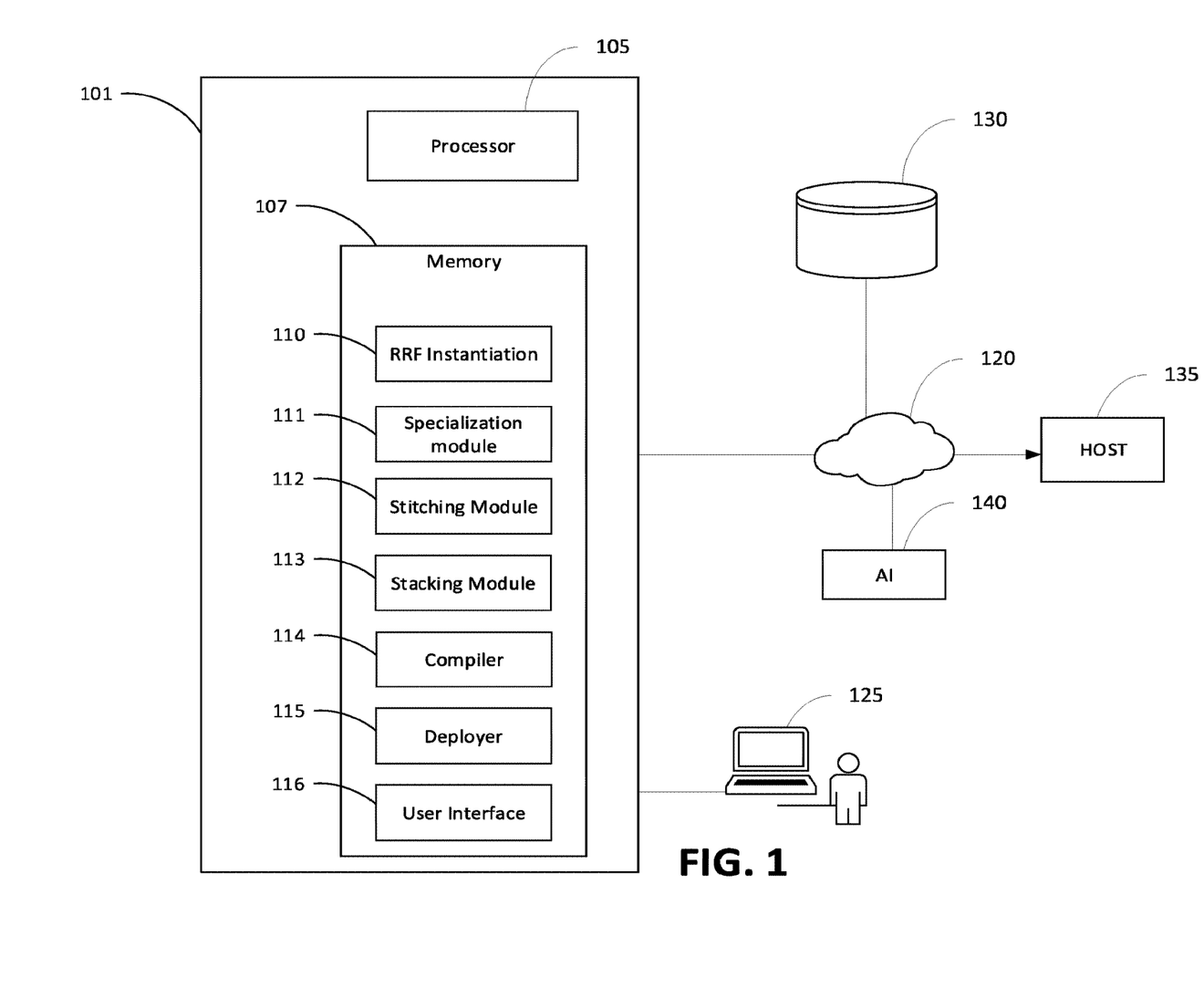
FIG. 1 shows an example of a system for creating and adapting a runtime system in accordance with embodiments of the present disclosure.

FIG. 1 shows an example of a system for creating and adapting a runtime system in accordance with embodiments of the present disclosure. A computing device 101 includes a processor 105 that executes modular algorithmic modules stored in a non-transitory memory 107, including an RRF instantiation module 110, a specialization module 111, a stitching module 112, a stacking module 113, a compiler 114, a deployer 115, and user interface module 116. A user may operate computing device 101 through a user interface 125, such as a keyboard, display, touchscreen, or the like. In an embodiment, RRFs are defined and configured by specialization of each RRF, stitching of RRFs, and stacking of RRFs using a configuration-based language. Once the runtime system is developed and compiled, it may be deployed to a host device or system 135 via a network connection 120. A storage device or network 130 is accessible to the computing device 101 via the network 120, which may store an RRF database of data used as a repository of available RRFs, instantiated RRFs, and configuration data generated during creation of the runtime system. The RRF database of available RRFs may be created beforehand by a runtime system provider. A remote artificial intelligence (AI) module 140, accessible via a network 120, interfaces with memory 107 and can be trained to generate a model to determine optimized parameters for the RRFs.

For new runtime system development, an RRF instantiation module 110 is configured to execute instantiation of each RRF according to a Runtime Specification Language, extracting information about the available RRFs and parameter ranges from the RRF database in storage 130. Selection of RRFs to be instantiated are based on requirements of the automation system. In an embodiment, a runtime system adaptation may be implemented by starting with an existing runtime system as a working template, and one or more additional functionalities can be appended to the adapted runtime system by RRF instantiation module 110.

Specialization module 111 is configured to execute a specialization operation to configure or customize each RRF to satisfy functional and non-functional requirements of the automation system. Each RRF is definable with selectable options for functions and subfunctions. For example, a Scheduling RRF may be defined by a user through a user interface by selecting from among functions listed in Table 1, such as (a) soft scheduling, or (b) hard scheduling (e.g., static hard scheduling, dynamic hard scheduling). Subfunction options for hard scheduling can include preemptive, and non-preemptive. More particularly, the runtime system may include a scheduling RRF defined such that resources are allocated using dynamic hard non-preemptive scheduling. In an embodiment, specialization module 111 is configured to directly execute instantiation of an RRF for the runtime system in a manner as described above for the RRF instantiation module 110, acting as a substitution.

Stitching module 112 is configured to execute a stitching operation between to RRS such that the outputs of one RRF become the inputs of another RRF. For example, in the case where information of a Timing RRF must be communicated to a Scheduling RRF for it to perform its function, stitching module 112 stitches the Timing RRF to the Scheduling RRF.

Stacking module 113 is configured to execute a stacking operation such that RRFs can be aggregated and layered to create new abstractions, functionality, and services. For example, a Logging RRF can be stacked on top of a Timing RRF configured as hard real-time, or a Scheduling RRF configured as preemptive dynamic scheduler. By stacking of the Logging RRF with other RRFs, the Logging RRF can provide logging capabilities of the data generated by the underlying RRFs. In an embodiment, two or more RRFs are stacked to define or adapt a portion of the runtime system.

Generally, a computer-accessible medium may include any tangible or non-transitory storage media or memory media such as electronic, magnetic, or optical media—e.g., disk or CD/DVD-ROM coupled to computing device 101. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Figure 2:
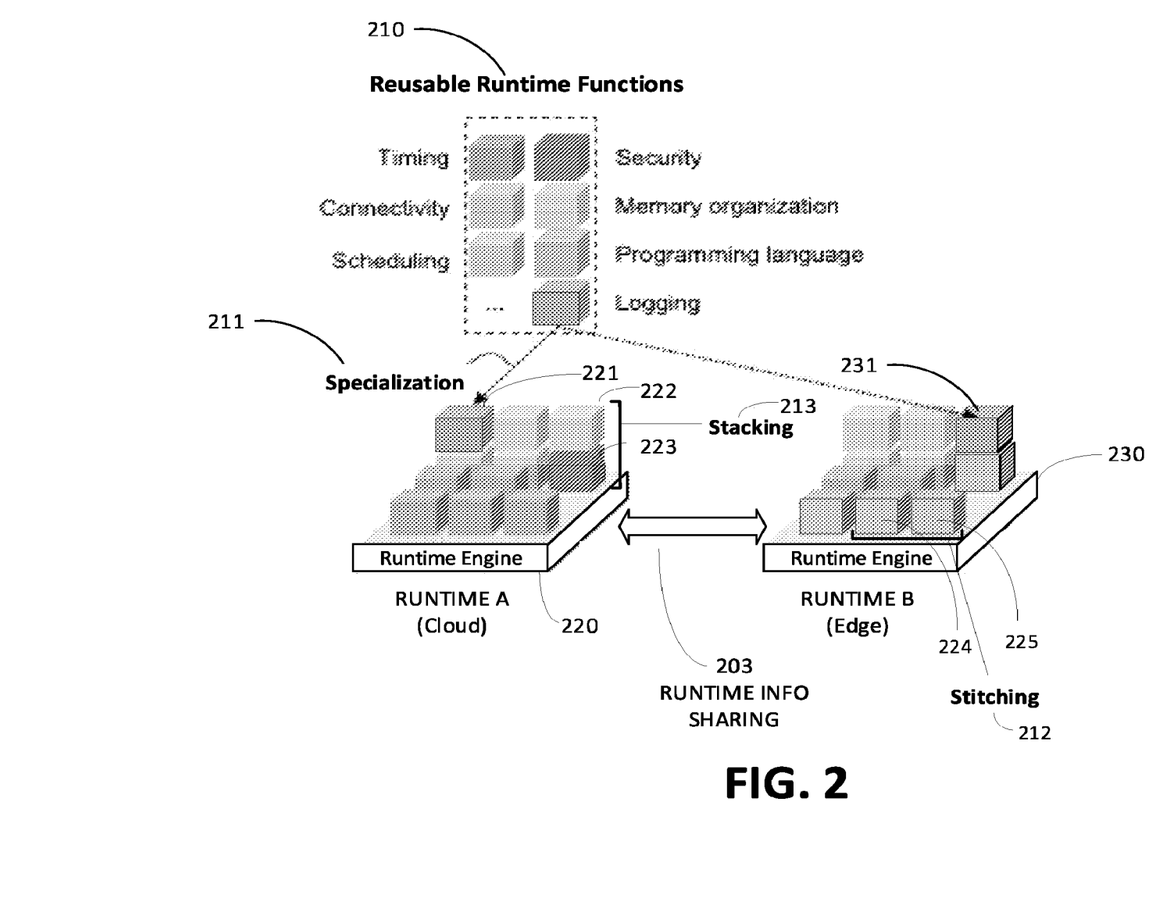
FIG. 2 shows an example of a runtime system adapted from an existing runtime system in accordance with embodiments of this disclosure.

FIG. 2 shows an example of a runtime system adapted from an existing runtime system in accordance with embodiments of this disclosure. In this example, an existing runtime system Runtime_A is configured with a cloud-based runtime engine 220. A new runtime system Runtime_B, here configured with an edge-based runtime engine 230, can be adapted from runtime system Runtime_A using runtime info sharing 203, and then performing specialization, stitching, and stacking operations to reconfigure the assembly of RRFs according to the new requirements of the runtime system data flow. As shown, specialization operation 211 for Logging RRF 221 is customized to specifications for runtime system Runtime_A while Logging RRF 231 is customized to unique operational needs of runtime system Runtime_B. Stitching operation 212 for various RRFs, such as stitching of Timing RRF 224 and Scheduling RRF 225 allows timing information output by Timing RRF 224 to be input for Scheduling RRF. Stacking operation 213 of RRFs, such as stacking of Scheduling RRF 222 and Security RRF 223, is utilized for runtime system Runtime_A, whereby scheduling of security data is established. Generally, scheduling of any function can be achieved by stacking the Scheduling RRF 222 on top of the respective RRF associated with the particular function to be scheduled. The stacking, stitching and specialization operations executed for adapted runtime system Runtime_B generate a configuration of RRFs that is unique from runtime system Runtime_A.

Figure 3:
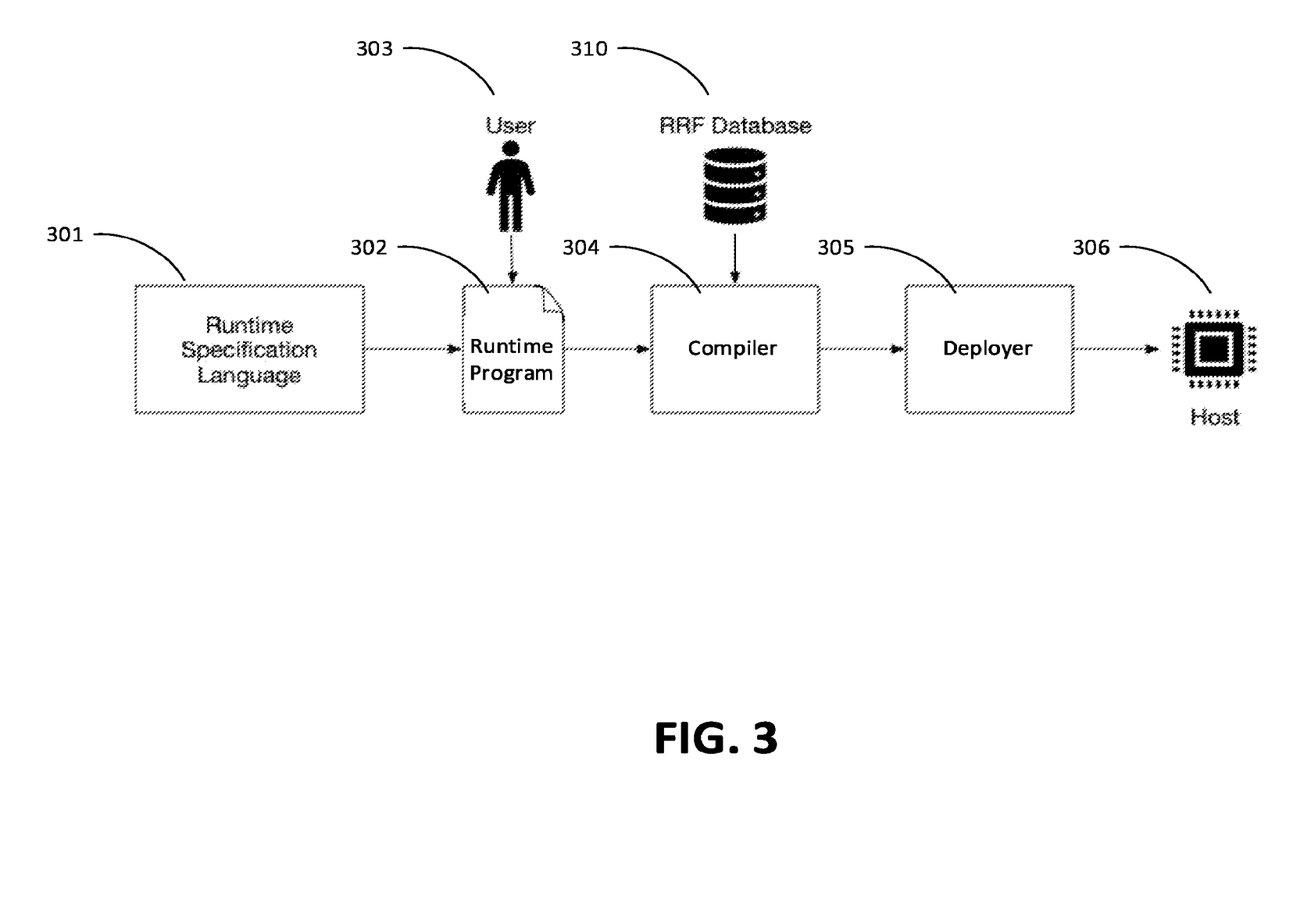
FIG. 3 shows an example of a runtime system development and deployment onto a host device in accordance with embodiments of this disclosure.

FIG. 3 shows an example of a runtime system development and deployment onto a host device as a runtime system in accordance with embodiments of this disclosure. In an embodiment, Runtime Specification Language (RSL) 301 is used to instantiate an RRF and to specialize, stitch and stack RRFs for a new or adapted runtime system. A runtime program 302 is developed according to RSL 301, with user 303 defining specifications of the runtime system using the available RRFs. In an embodiment, user interface 116 (FIG. 1) is configured to process received instructions to define parameters and variables for the RRFs. For example, a user 303 may enter instructions according to the RSL 301 on a command line interface (CLI) (e.g., using user interface 125 shown in FIG. 1). In an embodiment, AI module 140 (FIG. 1) is trained to learn optimized RRF parameters for requirements of the automation system, and composes elements of the runtime program 302 to define specifications of the runtime system. The contribution of the AI module may be to compose parts of the runtime program 302, to be presented to the user at the user interface for assistance in developing the runtime program 302.

The compiler 304 compiles the runtime program 302 to generate the runtime code. In an embodiment, the runtime system includes an RRF database 310 with available RRFs, each RRF having a parameter field with selectable options such as presented in Table 1. Compiler 304 uses RRF database 310 to map variables of the runtime program 302 to the RRFs and the RRF parameters according to the specifications of the runtime program 302, generating a compiled runtime code that can be used by the RSL deployer 305.

Deployer 305 deploys the compiled runtime code onto a host system 306 to enable runtime operation by the host's operating system. Deployer 305 is configured to deploy to either edge-based host systems 306 or cloud-based host systems 306. Each RRF has its own minimum/maximum computing resources requirements (e.g., CPU power, computing power, RAM size, internal storage, external storage/flash, etc.). Together they constitute the configurable computing resource for the runtime system. The deployer 305 takes these resource requirements and finds a valid allocation in the host system 306 to execute the runtime operation properly. This can be formulated as an optimization problem.

With the introduction of software defined runtime according to the RSL as presented in the disclosed embodiments, each function of the set of RFFs is exposed to the user at a top level for ease in constructing and arranging the configuration of the runtime system interfaces which are applied at lower levels once compiled and deployed. In an embodiment, RRFs are instantiated, specialized, stitched, and stacked according to the RSL, as illustrated by the following examples. An RRF is instantiated in RSL using a keyword. For example, using a keyword "new", the following RSL expressions instantiate a Scheduling RRF object into a MyScheduler variable, and a Timing RRF into a MyTiming variable.

MyScheduler=new RRF.Scheduler( )
MyTiming=new RRF.Timing( )

The specialization operation on RRFs can be executed via parameters when the RRF is already instantiated, or independently using the functions of the RRF object. For example, creating a dynamic non-preemptive scheduler can be defined according to the RSL as follows for an instantiated RRF:

MyScheduler1=new RRF.Scheduler({"scheduler_type": "dynamic",
"preemptiveness":"non-preemptive" })

Alternatively, the RRF specialization can be defined according to the RSL by independently setting parameters as follows:

MyScheduler1=new RRF.Scheduler( )
MyScheduler1.setSchedulerType("dynamic")
MyScheduler1.setPreemptiveness("non-preemptive")

The stitching operation on RRFs can be executed using a keyword in the RSL. For example, the stitching of a Scheduling RRF and a Timing RRF can be defined by a variable MyBasicRuntimeBehavior using a keyword "compose" as follows:

MyScheduler=new RRF.Scheduler({"scheduler_type": "dynamic",
"preemptiveness":"non-preemptive" })
MyTiming=new RRF.Timing({"timing type":"hard-real-time",
"time_resolution":"100" })
MyBasicRuntimeBehavior=compose(MyScheduler, Mytiming)

The stacking operation on RRFs allows reuse of functionality. Stacking capabilities can be created as reusable modules according to the RSL. For example, a basic runtime behavior variable MyBasicRuntimeBehavior can be encapsulated in a module using a "compose" keyword according to the following RSL expressions:

Module SchedulingAndTiming {
  MyScheduler=new RRF.Scheduler({"scheduler_type": "dynamic",
    preemptiveness": "non-preemptive" })
  MyTiming=new RRF.Timing({"timing type":"hard-real-time",
    time_resolution":"100" })
  return MyBasicRuntimeBehavior=compose(MyScheduler, Mytiming)
}

After a module is created, the stacking operation can be completed using a keyword (e.g., a "compose" keyword). For example, stacking a Logging RRF on top of a SchedulingAndTiming functionality provided by the Module above can be done as follows:

MyLogging=new RRF.Logging({"compression":true})
MyBasicRuntime=SchedulingAndTiming( )
MyComplexRuntime=compose(MyLogging, MyBasicRuntime)

Note that this pattern can be repeated as many times as needed, thus providing unlimited layering and stacking functionality.

In an embodiment, the runtime system can be automatically generated by algorithms and tested with intended applications. AI techniques can be used to learn the optimal way to compose RRFs of the runtime system, including the stitching, stacking and specialization operations as described above. An AI pipeline can be trained to produce the optimal RRF parameters and RRF configurations for the runtime system that are suitable for its specific usage (e.g., a software dashboard for a cutting machine, or a specialized audio diagnostic application). An advantage of using an AI pipeline for optimizing the runtime system parameters is the ability to quickly solve for parameters of disparate application requirements.

Figure 4:
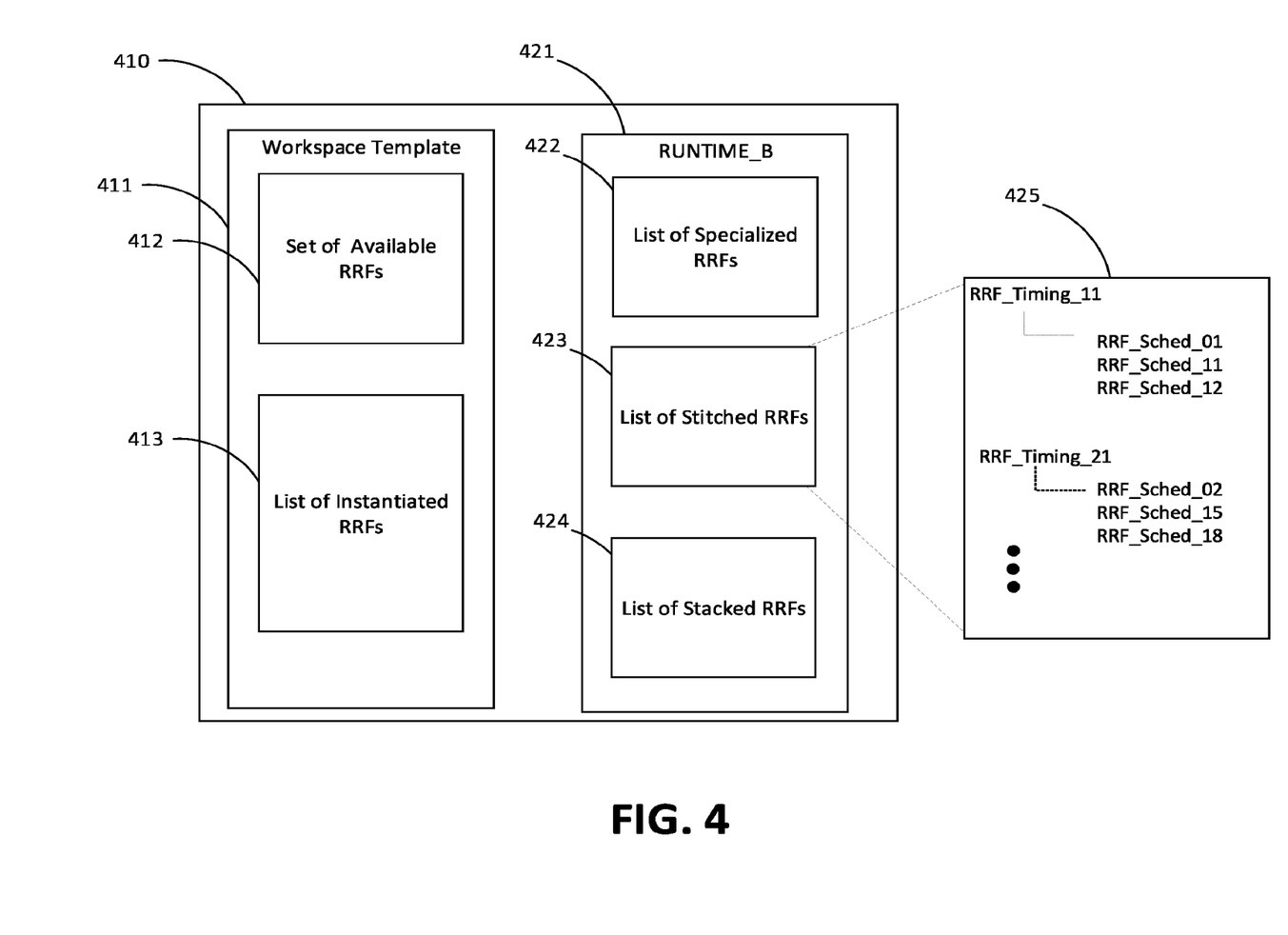
FIG. 4 illustrates an example of visualization display for development of the runtime system in accordance with the embodiments of this disclosure.

FIG. 4 illustrates an example of visualization display for development of the runtime system in accordance with the embodiments of this disclosure. During development of the runtime system, a user interface 410 may be configured to display information to the user as a dashboard presentation of RRF configuration status, which can accelerate the runtime system composition time. For example, a workspace template 411 may be displayed to show the set of available RRFs, such as those presented in Table 1, and stored in RRF database 310. A list of instantiated RRFs 413 may be displayed to track the RRFs that have been defined so far. One or more specific runtime system dashboards 421 may be displayed, such as for Runtime_B as shown. In an embodiment, when adapting a new runtime system from an existing runtime system, two such dashboards 421 may be displayed, one for each respective runtime system. Tracking of specialization operations may be displayed as a list of specialized RRFs 422. Similarly, tracking of stitching and stacking operations may be displayed as a list of stitched RRFs 423 and a list of stacked RRFs 424, respectively. Display 425 illustrates an example for how a list of stitched RRFs 423 may be displayed. The lists 422, 424 for stacking and specialization operations may be presented in a similar manner. In an embodiment, a user accesses the runtime system configuration using the interface 410 at any time during the lifecycle of the runtime system, such as during development, testing, and after deployment. Such access permits modification to the runtime system configuration of RRFs, even while the automation is operational.

In summary, the disclosed embodiments for adapting a reconfigurable runtime system using reusable runtime functions include the following advantages over prior art.

Safer and more secure runtimes can be composed by generating only the features that are needed to meet system requirements and eliminating bloat of unneeded dormant features.

Runtime properties are specified according to a configuration, from which an engineering interface can be generated automatically (syntax checker, SDK).

Runtime systems can be modified or enhanced without downtime. For example, if a new runtime system is developed to include OPC-UA communication protocol functionality, but all the communications for the last three years has used PROFINET protocol in an automation system deployment, the runtime system can put the OPC-UA function module on sleep-mode to improve performance.

New function modules can be easily added to the runtime system after deployment. For example, a ModBus module can be added on-the-fly.

Services are easily added to the runtime. For example, in a case where a PLC was deployed originally without HMI service, but then later such service is required, it can be added in the configuration and the new HMI service is enabled and can be deployed in any available hardware.

Extendibility and scalability for runtime systems is improved by allowing a user to extend the original set of RFF parameters that exist at deployment to an expanded set of parameters that arise with automation system and software version updates. Such expansion is simplified with stitching and stacking operations without having to change the interface, making the runtime system reusable over time.

Customization by the user is made possible by exposing the RFFs to the user in the form of a runtime specification language, unlike conventional hardcoded runtime systems that require a custom order from the supplier, eliminating delays.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The block diagrams in the Figures illustrate the architecture, functionality, and operation of possible implementations of systems, methods, and computer program products according to various embodiments of the present disclosure. In this regard, each block in the block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams illustration, and combinations of blocks in the block diagrams illustration, can be implemented by special purpose hardware-based systems that perform the specified functions or acts or carry out combinations of special purpose hardware and computer instructions.

What is claimed is:

1. A system for constructing a reconfigurable runtime system used in an automation system using reusable runtime functions (RRFs), comprising:

a memory having modules stored thereon; and
a processor for performing executable instructions in the modules stored on the memory, the modules comprising:
 a specialization module configured to execute a specialization operation to configure or customize a number of RRFs to satisfy functional requirements of the automation system, wherein each RRF is definable with selectable options for functions and subfunctions, and wherein the RRFs include at least one scheduling RRF defined such that resources are allocated using dynamic hard non-preemptive scheduling, at least one timing RRF, and at least one logging RRF;
 a stitching module configured to execute a stitching operation that connects output of the at least one timing RRF to input of the at least one scheduling RRF, allowing timing information output by the at least one timing RRF to be input for the at least one scheduling RRF; and
 a stacking module configured to execute a stacking operation that stacks the at least one logging RRF on top of the at least one timing RRF configured as hard real-time, or on top of the at least one scheduling RRF configured as preemptive dynamic scheduler, wherein the at least one logging RRF provides logging capabilities of data generated by respective underlying RRFs as layers to create new abstractions, functionality and services;
 wherein the specialization operation, the stitching operation, and the stacking operation are each executed using one or more keywords according to a runtime specification language.

2. The system of claim 1, further comprising:
a compiler configured to compile a runtime system language program using a RRF database to map the RRFs to defined variables of a runtime program, producing a runtime code; and
a deployer configured to deploy the runtime code to a host system.

3. The system of claim 1, wherein the memory interfaces with a remote artificial intelligence module to generate a trained model to produce optimized RRF parameters for the automation system.

4. The system of claim 1, wherein the specialization module is further configured to instantiate an RRF according to the runtime specification language, selecting the RRF for instantiation from an RRF database of available RRFs and based on requirements of the automation system.

5. The system of claim 1, further comprising a user interface configured to receive elements of the runtime program from a trained artificial intelligence module to assist the user in development of a runtime program that defines specifications of the runtime system.

6. The system of claim 1, wherein the RRFs include one or more of the following: code organization, connectivity, analog to digital encoding/decoding, hosting type, interrupt and failure handling, logging, memory organization, communication openness, process image, programming language, scaling, scheduling, security, and timing.

7. A method for constructing a reconfigurable runtime system used in an automation system using reusable runtime functions (RRFs), comprising:
executing, by a specialization module, a specialization operation to configure or customize a number of RRFs to satisfy functional requirements of the automation system, wherein each RRF is definable with selectable options for functions and subfunctions, and wherein the RRFs include at least one scheduling RRF defined such that resources are allocated using dynamic hard non-preemptive scheduling, at least one timing RRF, and at least one logging RRF;

executing, by a stitching module, a stitching operation that connects output of the at least one timing RRF to input of the at least one scheduling RRF, allowing timing information output by the at least one timing RRF to be input for the at least one scheduling RRF; and executing, by a stacking module, a stacking operation that stacks the at least one logging RRF on top of the at least one timing RRF configured as hard real-time, or on top of the at least one scheduling RRF configured as preemptive dynamic scheduler, wherein the at least one logging RRF provides logging capabilities of data generated by respective underlying RRFs as layers to create new abstractions, functionality and services;

wherein the specialization operation, the stitching operation, and the stacking operation are each executed using one or more keywords according to a runtime specification language.

8. The method of claim 7, further comprising:
compiling a runtime system language program using a RRF database to map the RRFs to defined variables of a runtime program, producing a runtime code; and
deploying the runtime code to a host system.

9. The method of claim 7, further comprising:
interfacing with a remote artificial intelligence module to generate a trained model to produce optimized RRF parameters for the automation system.

10. The method of claim 7, wherein the specialization module is further configured to instantiate an RRF according to the runtime specification language, selecting the RRF for instantiation from an RRF database of available RRFs and based on requirements of the automation system.

11. The method of claim 7, further comprising:
receiving elements of the runtime program from a trained artificial intelligence module to assist the user in development of a runtime program that defines specifications of the runtime system.

12. A non-transitory computer-readable medium storing instructions for constructing a reconfigurable runtime system used in an automation system using reusable runtime functions (RRFs) that, when executed by a computer, cause it to perform the following steps:

executing, by a specialization module, a specialization operation to configure or customize a number of RRFs to satisfy functional requirements of the automation system, wherein each RRF is definable with selectable options for functions and subfunctions, and wherein the RRFs include at least one scheduling RRF defined such that resources are allocated using dynamic hard non-preemptive scheduling, at least one timing RRF, and at least one logging RRF;

executing, by a stitching module, a stitching operation that connects output of the at least one timing RRF to input of the at least one scheduling RRF, allowing timing information output by the at least one timing RRF to be input for the at least one scheduling RRF; and executing, by a stacking module, a stacking operation that stacks the at least one logging RRF on top of the at least one timing RRF configured as hard real-time, or on top of the at least one scheduling RRF configured as preemptive dynamic scheduler, wherein the at least one logging RRF provides logging capabilities of data generated by respective underlying RRFs as layers to create new abstractions, functionality and services;

wherein the specialization operation, the stitching operation, and the stacking operation are each executed using one or more keywords according to a runtime specification language.

13. The non-transitory computer-readable medium of claim 12, further comprising the step of:
compiling a runtime system language program using a RRF database to map the RRFs to defined variables of a runtime program; and
deploying runtime code to a host system.

14. The non-transitory computer-readable medium of claim 12, further comprising the step of:
generating a trained artificial intelligence model to produce optimal parameters for a specific usage of the runtime system.

15. The non-transitory computer-readable medium of claim 12, wherein the specialization module is further configured to instantiate an RRF according to the runtime specification language, selecting the RRF for instantiation from an RRF database of available RRFs and based on requirements of the automation system.

* * * * *